(12) United States Patent
Itakura (10) Patent No.: US 7,384,029 B2
(45) Date of Patent: Jun. 10, 2008

(54) VIBRATION PROOF DAMPER FORMING METHOD AND DAMPER INTEGRATION TYPE MECHANICAL CHASSIS

(75) Inventor: Masayuki Itakura, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 09/991,934

(22) Filed: Nov. 26, 2001

(65) Prior Publication Data
US 2002/0089101 A1 Jul. 11, 2002

(30) Foreign Application Priority Data
Nov. 27, 2000 (JP) ............................. 2000-359928

(51) Int. Cl.
*F16F 1/36* (2006.01)
(52) U.S. Cl. ................. 267/153; 267/140.11; 720/292
(58) Field of Classification Search ................ 267/152, 267/153, 160, 136, 140.11, 141, 141.3, 141.4, 267/140.13, 140.5; 248/635, 634–6, 636, 248/560; 369/263, 247, 248, 284, 282, 263.1; 264/255, 262, 328.7; 720/651, 688, 692, 720/693, 694; 2/694
See application file for complete search history.

(56) References Cited

U.S. PATENT DOCUMENTS

| | | | | | |
|---|---|---|---|---|---|
| 3,059,882 A | * | 10/1962 | Staar | ............................ | 248/561 |
| 3,895,408 A | * | 7/1975 | Leingang | ....................... | 16/2.1 |
| 4,158,450 A | * | 6/1979 | Suzuki | ......................... | 248/694 |
| 4,385,025 A | * | 5/1983 | Salerno et al. | ............... | 264/255 |
| 4,794,588 A | * | 12/1988 | Yoshitoshi et al. | .......... | 369/263 |
| 5,145,039 A | * | 9/1992 | Morikawa et al. | ........... | 188/298 |
| 5,323,885 A | * | 6/1994 | Fukunaga et al. | ........... | 188/381 |
| 5,347,507 A | * | 9/1994 | Kuhn | ........................... | 369/263 |
| 5,379,990 A | * | 1/1995 | Ando et al. | .................... | 267/34 |
| 5,953,303 A | * | 9/1999 | Sugano et al. | ............. | 369/75.1 |
| 5,956,314 A | * | 9/1999 | Ishimatsu et al. | ........... | 369/247 |

(Continued)

FOREIGN PATENT DOCUMENTS

EP 0570138 A2 11/1993

(Continued)

OTHER PUBLICATIONS

English abstract of JP-9147537.*

*Primary Examiner*—Bradley King
(74) *Attorney, Agent, or Firm*—Rader, Fishman & Grauer PLLC (57) ABSTRACT

In a vibration preventing damper forming method and a vibration preventing damper integrally formed with a mechanical chassis according to the present invention, an opening side end portion 9e of a damper housing 9 and a vibration preventing damper forming portion of a mechanical chassis 6 are made of a resin. The damper housing 9 is mounted on the vibration preventing damper forming portion by the fixture of the resin portions. Thus, a vibration preventing damper 8 is integrally formed with the mechanical chassis 6. For this reason, in supporting in a vibration proof manner and in a floating matter the mechanical chassis 6 within an interior of a casing 10 by means of the vibration preventing damper 8, it is possible to improve the working efficiency in mounting the mechanical chassis 6 to the casing 10 and to cope with the requirement of miniaturization of a mounting space between the interior of the casing 10 and the mechanical chassis 6.

12 Claims, 6 Drawing Sheets

U.S. PATENT DOCUMENTS

| | | | |
|---|---|---|---|
| 6,039,299 A | 3/2000 | Ohnishi et al. | |
| 6,045,113 A * | 4/2000 | Itakura | 248/635 |
| 6,310,853 B1 * | 10/2001 | Ito | 369/192 |
| 6,324,153 B2 * | 11/2001 | Furukawa et al. | 369/263 |
| 6,426,935 B1 * | 7/2002 | Imai et al. | 369/263 |
| 6,439,551 B1 * | 8/2002 | Kato | 267/113 |
| 2003/0112735 A1 * | 6/2003 | Itakura | 369/263 |

FOREIGN PATENT DOCUMENTS

| | | | |
|---|---|---|---|
| EP | 0583946 A1 | | 2/1994 |
| EP | 0750309 A1 | | 12/1996 |
| EP | 001209685 A2 | * | 5/2002 |
| EP | 001209685 A3 | * | 1/2003 |
| JP | 62165041 A | * | 7/1987 |
| JP | 6458828 A | * | 3/1989 |
| JP | 737375 A | * | 2/1995 |
| JP | 07037375 | | 2/1995 |
| JP | 09147537 | | 6/1997 |
| JP | 11010660 | | 1/1999 |
| JP | 2002-163882 | * | 6/2002 |
| WO | WO-9936909 A1 | * | 7/1999 |

* cited by examiner

VIBRATION PROOF DAMPER FORMING METHOD AND DAMPER INTEGRATION TYPE MECHANICAL CHASSIS

BACKGROUND OF THE INVENTION

1. Field of the Invention

The present invention relates to a vibration proof or preventing damper, and more particularly to a vibration preventing technology suitable for equipments such as automotive audio systems or portable personal computers provided with a reading mechanism for reading data from a recording medium such as a CD, a CD-ROM and a hard disc in a non-contact manner.

2. Description of the Related Art

Figure 5A:
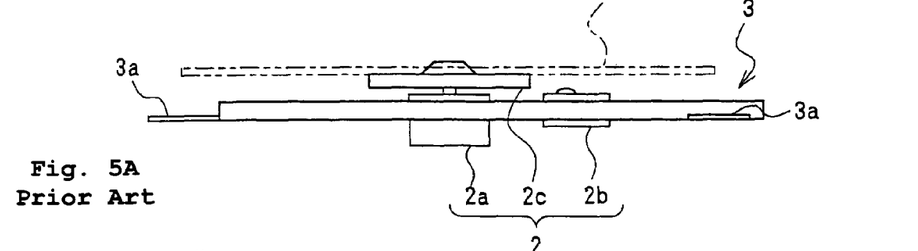
FIG. 5A is a partial schematic cross sectional view showing a mechanical chassis in accordance with a conventional example.
Figure 5B:
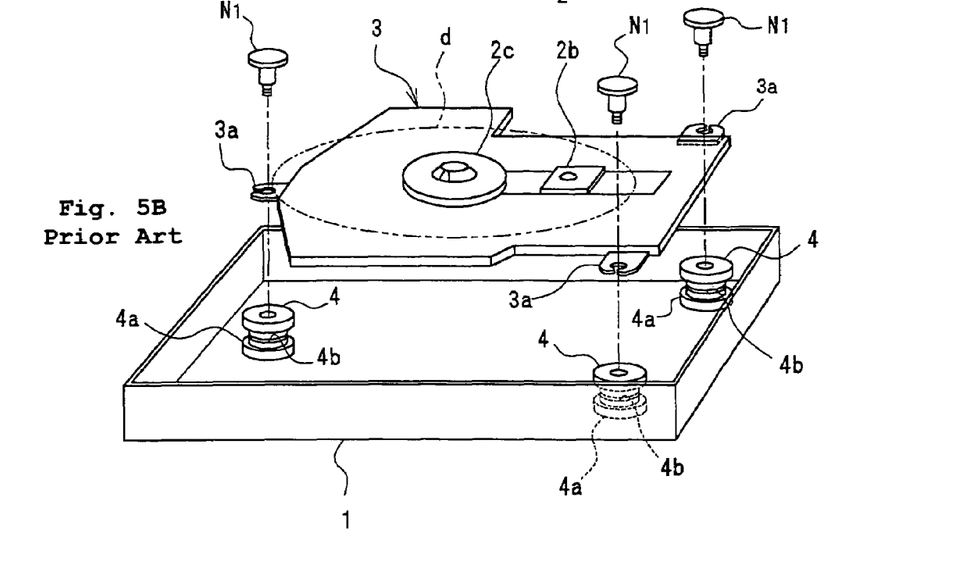
FIG. 5B is an illustration of the mechanical chassis to be mounted on a casing.
Figure 5C:
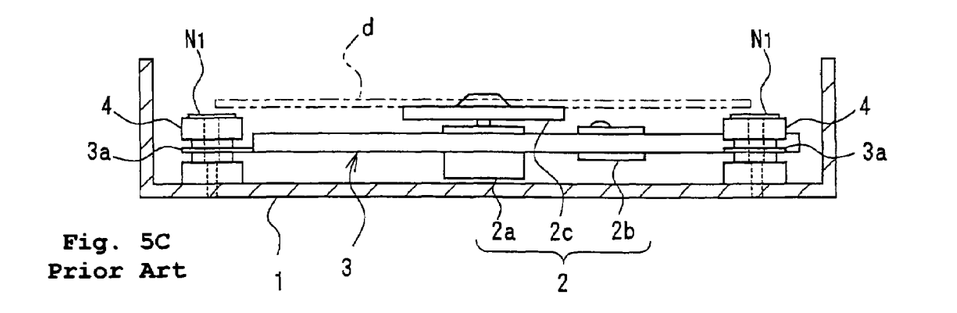
FIG. 5C is an illustration showing a mounted condition of the mechanical chassis to the casing.
Figure 6A:
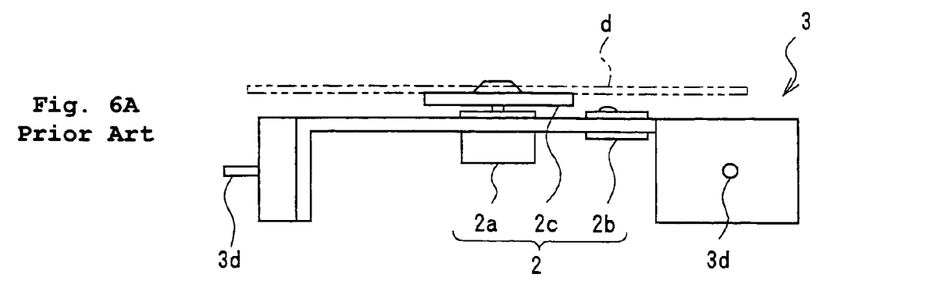
FIG. 6A is a partial schematic cross sectional view showing a mechanical chassis in accordance with another conventional example.
Figure 6B:
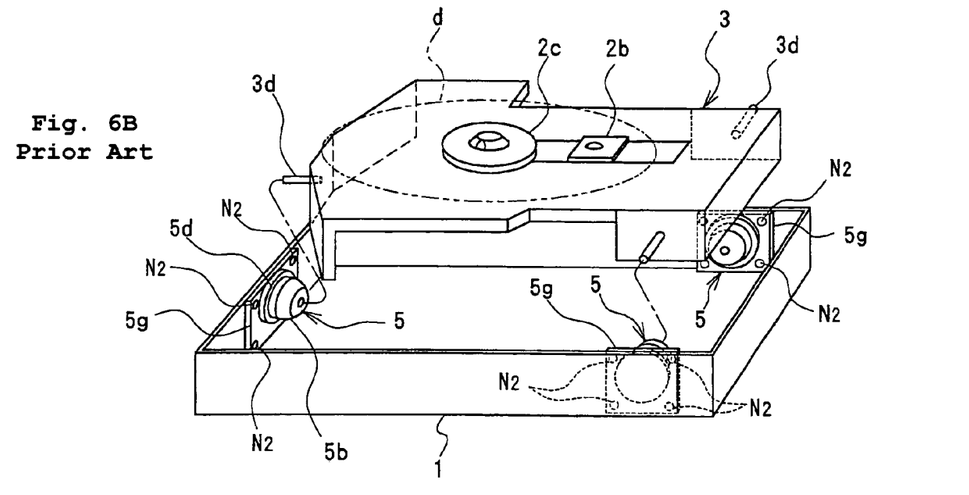
FIG. 6B is an illustration of the mechanical chassis to be mounted on a casing.
Figure 6C:
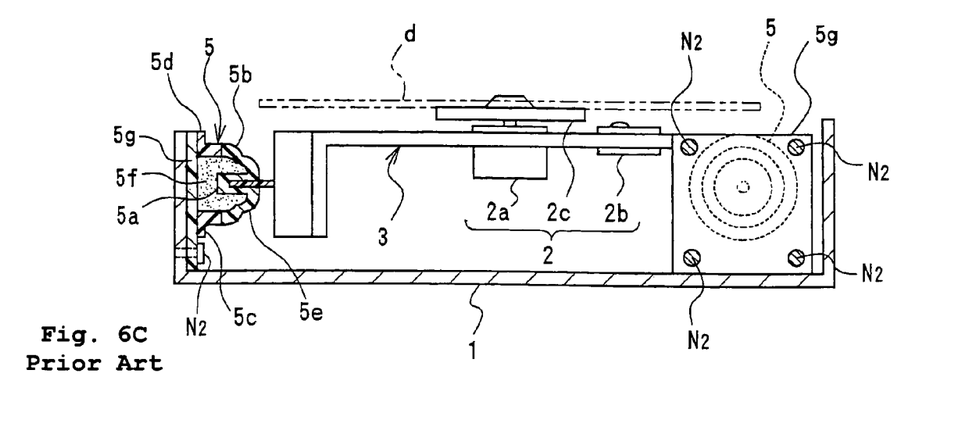
FIG. 6C is an illustration showing a mounted condition of the mechanical chassis to the casing.

In the equipment provided with such non-contact type reading mechanism for the recording medium in which the vibrations should be prevented, a variety of vibration proof means have been conventionally provided in order to attenuate vibrations that adversely affect the readout of the data. FIGS. 5 and 6 schematically show reproduction devices used in, for example, personal computers or automotive audio systems. These reproduction devices are adapted to optically read out music data from a music CD and reproduce them. A mechanical chassis 3 provided with a motor 2a, an optical pickup 2b, a disc table 2c and the like is installed in an interior of a casing 1. The mechanical chassis 3 is supported elastically within the interior of the casing 1 by vibration preventing dampers 4 and 5 in a vibration preventing manner so that the vibration hardly would be transferred.

Such vibration preventing dampers 4 and 5 are typically shown in two types as shown in FIGS. 5A to 5C and 6A to 6C. The device shown in FIGS. 5A to 5C is an insulator type damper in which the vibration preventing damper 4 is composed of an elastic cylindrical member 4a made of rubber or the like and each of the engagement recess grooves 4b provided circumferentially on a side surface is fitted inside of a C-shaped engagement projection 3a of the mechanical chassis 3. Then, when amounting screw $N_1$ is inserted into the hollow interior of the elastic cylindrical member 4a and threadedly fixed to the casing 1, the mechanical chassis 3 are supported elastically at a plurality of positions by the vibration preventing dampers 4 within the casing 1 in a vibration preventing manner.

Further, the device shown in FIGS. 6A to 6C is of a type in which viscous fluid is sealed in the interior and the vibration is attenuated by utilizing the viscous fluid resistance of the viscous fluid. This vibration preventing damper 5 has a bottomed cylindrical agitating sleeve portion 5a and is provided with a damper housing 5e consisting of an elastic wall portion 5b to elastically deform in the three-dimensional directions to suppress the floating movement of the agitating sleeve portion 5a and to expand so as to surround the agitating sleeve portion 5a and a circumferential all portion 5d made of a hard resin, fixed at one end to an elastic wall portion 5b and having an outward flange 5c at the other end. A viscous fluid 5f is filled in the interior of the damper housing 5c and sealed by fixing a lid member 5q to the damper housing 5e to form the vibration preventing damper 5. Then, when the vibration preventing damper 5 is mounted on the mechanical chassis 3, a support rod 3b projecting from the mechanical chassis 3 is inserted into the agitating sleeve portion 5a and held thereat. Further, when the vibration preventing damper 5 is mounted on the casing 1, a mounting screw $N_2$ is inserted into a screw hole formed in the lid member 5g and then screwed to the casing 1. Thus, the mechanical chassis 3 are elastically supported at a plurality of positions by the vibration preventing dampers 5 within the interior of the casing 1 in the vibration preventing manner.

As described above, the excellent vibration attenuating effect by the vibration preventing dampers 4 and 5 is exhibited, whereby the vibration would be hardly transferred from the casing 1 from the mechanical chassis 3 elastically supported within the interior of the casing 1. However, there are some problems. One of them is a degradation in working efficiency when the chassis is mounted on the casing 1.

Namely, in any conventional example shown in FIGS. 5A to 5C and 6A to 6C, the mechanical chassis 3 and the vibration preventing dampers 4 and 5 are formed into separate pieces. For this reason, in order to complete the mounting work between the mechanical chassis 3 and the casing 1, in the case of the conventional example shown in FIGS. 5A to 5C, in addition to the mounting work of the vibration preventing damper 4 to the mechanical chassis 3, a screwing step using a much larger number of mounting screws $N_1$ is required. Accordingly, the number of steps is increased and the steps are troublesome. Further, in the case of the conventional case shown in FIGS. 6A to 6C, in addition to the mounting work between the vibration preventing damper 5 and the mechanical chassis 3, it is necessary to perform the screwing work between the vibration preventing damper 5 and the casing 1 using a plurality of mounting screws $N_2$. Further, in this case, a large number of steps are required.

Further, in addition to such degradation in working efficiency, there is a problem in coping with a miniaturization for the mounting space. The tendency of miniaturization of the equipment, i.e., the demand for downsizing is increasing day by day. Such demand is remarkable in the field of automotive audio systems or notebook personal computers. Namely, in the case of the conventional examples shown in FIGS. 5A to 5C and 6A to 6C, if the casing 1 is miniaturized, correspondingly, the mechanical chassis 3 is also to be miniaturized. As a result, the mounting space for the vibration preventing dampers 4 and 5, that is, a gap between the inner wall of the casing 1 and the mechanical chassis 3 is also narrowed. Accordingly, in order to meet this miniaturization requirement, in the case of the vibration preventing damper 4 shown in FIGS. 5A to 5C, it is inevitable to reduce a height of the cylindrical elastic member 4a. If so, there are some cases where it is impossible to realize the vibration attenuation performance that is required. Further, in the case of the vibration preventing damper 5 shown in FIG. 6, if the circumferential wall portion 5d is more decreased and the agitating sleeve portion 5a is more shortened to thereby decrease the filling amount of the viscous fluid 5f for the miniaturization, it is possible to meet the requirement for the miniaturization. However, also, in this case, it is inevitable to sacrifice the vibration attenuation performance.

SUMMARY OF THE INVENTION

In view of the foregoing defects inherent in the prior art, an object of the present invention is to improve the working efficiency in mounting a mechanical chassis to a casing.

Further, another object of the present invention is to cope with the requirement of miniaturization of a mounting space.

In order to attain these objects, according to the present invention, there is provided a vibration preventing damper forming method characterized by comprising the steps of: forming, of a resin, an opening side end portion of a damper housing having a holder portion in the form of a container opened at one end for holding a support shaft provided in one of a casing and a mechanical chassis and an elastic wall portion that may reduce a floating movement of a support shaft due to elastic deformation in three-dimensional directions and a vibration preventing damper forming portion of the other of the casing and the mechanical chassis, mounting the damper housing to the vibration damper forming portion by the fixture of the resin to thereby integrally form the vibration preventing damper with the other one of the casing and the mechanical chassis.

The present invention is based upon a concept that the vibration preventing damper is directly formed on either one of the casing or the mechanical chassis. Namely, the vibration preventing damper forming portion of either casing or mechanical chassis is made of a resin, and the opening side end portion of the damper housing made of a resin is mounted by the fixture of the resin portions with each other, whereby the vibration preventing damper is formed integrally with the other of the casing and the mechanical chassis. For this reason, the mounting work of the vibration preventing damper that has been formed in a separate piece is dispensed with. In order to complete the mounting work of the mechanical chassis to the casing, any additional work is not necessary to thereby remarkably enhance the working efficiency. Then, in this case, since the casing or the mechanical chassis may also be used as a "lid" for closure of the damper housing, it is possible to miniaturize the vibration preventing damper corresponding to the thickness of the lid member in comparison with the conventional example in which the vibration preventing damper is regarded as a different piece from the casing and the mechanical chassis.

Note that the "resin material" and the "resin portion" referred to herein mean a plastic (a thermoplastic resin and a thermo setting resin) and an elastmer (a cross-linked rubber and thermoplastic elastmer or the like). Accordingly, as far as the mechanical chassis and the damper housing are bonded or heat bonded or melt bonded to be "fixed" to each other and the vibration preventing damper maybe formed integrally with the mechanical chassis, it is possible to suitably select the specific material in response to the required performance of the vibration preventing damper or the mechanical chassis and it is possible to select the above-described elastmer as the material for the mechanical chassis if the necessary performance is realized.

With respect to the above-described forming method, it is possible to integrally form the vibration preventing damper in either the casing or the mechanical chassis. However, it is necessary to form the vibration preventing damper of the resin material in any case. In this case, it is possible to form the casing or the mechanical chassis as a whose of a resin material. Further, in the case where the casing or the mechanical chassis is made of a metal in order to impart the rigidity or the precision, the vibration preventing damper forming portion is made of through a coinjection molding or insert molding. The casing or the mechanical chassis is thus formed, whereby it is possible to integrally and firmly form the damper housing with ease through thermal or heat bonding, melt bonding or an adhesive bonding.

Further, with respect to the above-described forming method, it is possible to integrally form some of the plurality of vibration preventing dampers to be formed for the casing and the other for the mechanical chassis. With such an arrangement, it is possible to form the vibration preventing damper on one side as far as the support shaft may be projectingly provided even if the vibration preventing damper is not formed on one of the casing and the mechanical chassis. Therefore, it is possible to eliminate the restriction in structure.

Then, according to the present invention, in order to attain the above-described objects, there is provided a mechanical chassis formed integrally with the vibration preventing damper according to the above-described forming method. Namely, according to the present invention, there is provided a mechanical chassis including a non-contact reading mechanism for a disc-like recording medium and the vibration preventing damper formed in accordance with the above-described forming method on a chassis supported in a floating condition through the vibration preventing damper within the casing, further comprising a resin portion at the vibration preventing damper forming portion of the chassis, in which the opening side end portion made of a resin material of the damper housing provided with the holder portion in the form of the container opened at one end for inserting the support shaft provided in the casing and holding and an elastic wall portion for reducing the floating movement of the support shaft due to elastic deformation in three-dimensional directions is fixed to the resin portion, and the vibration preventing damper is formed integrally with the chassis.

In this mechanical chassis, the resin portion is provided in the vibration preventing damper forming portion of the chassis. The opening side end portion made of a resin material of the damper housing is fixed to the resin portion. The vibration preventing damper is formed integrally with the chassis in advance. Accordingly, it is not necessary to perform the screwing work of the vibration preventing damper using the mounting screws. In addition, the mounting work of the mechanical chassis to the casing is performed simply by inserting the support shaft of the casing into the holder portion to thereby remarkably enhance the working efficiency. Further, according to this mechanical chassis, since the opening side end portion of the damper housing of the vibration preventing damper is fixed directly to the resin portion of the mechanical chassis, the mechanical chassis closes the opening side end portion as the "lid". Accordingly, the lid member that has been conventionally required is unnecessary and it is possible to reduce the height of the vibration preventing damper corresponding to the plate thickness thereof. Therefore, it is possible to cope with the miniaturization of the mounting space without adversely affecting the necessary vibration attenuation performance.

With respect to the mechanical chassis according to the present invention, it is possible to form the unit integrally either in case of an air damper for introducing and discharging the air between the inside and the outside of the vibration preventing damper due to the elastic deformation of the damper housing and for attenuating the vibration by the fluid resistance or a viscous fluid sealing damper filled with the viscous fluid in the interior of the vibration preventing damper for attenuating the vibration by the fluid resistance of the viscous fluid.

As an example of the former case, according to the present invention, there is provided the mechanical chassis in which a through hole for communicating air between an inside and an outside of the vibration preventing damper is formed in any portion of the vibration preventing damper forming portion in at least one of the vibration preventing damper and the chassis.

Further, as an example of the latter case, according to the present invention, there is provided the mechanical chassis according to the present invention, in which the holder portion of the damper housing is formed as a bottomed agitating shaft portion for holding the inserted support shaft provided in the casing and viscous fluid for giving an agitating resistance due to viscous fluidization to the agitating shaft portion that moves in accordance with the movement of the support shaft is provided within an interior of the vibration preventing damper.

With respect to the above-described mechanical chassis, the chassis as a whole may be made of a resin or of a metal material. In the case of the resin chassis, it is possible to firmly and integrally form the opening side end portion made of a resin material of the damper housing with each. Further, it is possible to form the chassis that is provided with the metal portion provided with the above-described non-contact reading mechanism and the resin portion formed integrally through the coinjection molding or insert molding including the vibration preventing damper forming portion on the metal portion.

Then, with respect to the above-described mechanical chassis, the damper housing is formed of the agitating sleeve portion and the elastic wall portion made of a soft resin such as the cross-linking rubber, thermoplastic elastmer or the like, and the opening side end portion of the elastic wall portion is fixed to the chassis as the opening side end portion of the damper housing to thereby form integrally the vibration preventing damper. In addition, the damper housing may be provided with the agitating sleeve portion and the elastic wall portion made of the above-described soft resin and the circumferential wall portion fixed at one end to the elastic wall portion and forming at the other end the opening side end portion of the damper housing and made of a thermoplastic synthetic resin or hard resin such as a thermo setting synthetic resin. Thus, the vibration preventing damper maybe formed integrally with the chassis. Then, according to the former case, the circumferential wall portion of the latter case is dispensed with, and it is possible to further reduce the height of the damper housing corresponding to the height of the circumferential wall portion. Further, according to the latter case, in accordance with the circumferential wall portion made of a hard resin, the rigidity may be imparted to the damper housing. Accordingly, it is possible to firmly support the mechanical chassis and to generate the fluid resistance positively while imparting the reactive force to the viscous fluid or air by the inner wall of the circumferential wall portion to thereby exhibit the higher vibration proof property.

Further, with respect to the above-described mechanical chassis, the through hole is provided in the vibration preventing damper forming portion in the resin chassis, the opening side end portion of the damper housing is fixed to the hole edge of the through hole in the one side surface of the resin chassis and the lid member made of a resin for closing the through hole is fixed to the hole edge of the through hole of the other side surface of the resin chassis.

In this mechanical chassis, it is possible to further reduce the size of the vibration preventing damper. Namely, the through hole is provided in the vibration preventing damper forming portion of the resin chassis and the lid member is fixed to the hole edge of the through hole on the other side surface of the resin chassis. It is possible to utilize the hole space corresponding to the plate thickness of the chassis in the through hole as the interior space (volume). Accordingly, even if the vibration preventing damper has the same volume, it is possible to further miniaturize the vibration preventing damper in the height direction or in the radial direction by the integration with the chassis.

The miniaturization is realized by the following three type mechanical chassis with respect to the further miniaturization of the vibration preventing damper. As one of these, in the mechanical chassis, a through hole is formed in the vibration preventing damper forming portion in one of a metal portion of a chassis and a metal chassis, a resin portion for covering a hole edge of the through hole with both front and rear surfaces of the chassis, the opening side end portion of the damper housing is fixed to the resin portion on one side surface of the chassis and a lid member made of a resin material is fixed to the resin portion on the other side surface of the chassis.

Further, as a second one, in the mechanical chassis, a through hole through which the damper housing may be inserted is provided in the vibration preventing damper forming portion of a resin chassis, an outward flange is provided on the opening side end portion of the damper housing, under the condition that the one side surface of the outward flange comes in contact with a hole edge of the through hole, the damper housing is fixed to the resin chassis and a lid member made of a resin material for closing the opening side end portion of the damper housing is fixed to the other side surface of the outward flange.

Furthermore, as a third one, in the mechanical chassis, a through hole through which the damper housing may be inserted is provided in the vibration preventing damper forming portion in one of a metal portion of a chassis and a metal chassis, a resin portion of the through hole is provided in a hole edge of the through hole, an outward flange is provided in the damper housing, under the condition that the one side surface of the outward flange comes in contact with one of a hole edge of the through hole and the resin portion on one side surface of the chassis, the damper housing is fixed to the resin portion and a lid member made of a resin material for closing the opening side end portion of the damper housing is fixed to the other side surface of the outward flange.

It will readily be understood that the content of the invention is not limited to those described above and the objects, advantages, features and use of the invention will become more apparent by reading the following description in conjunction with the accompanied drawings. Also, it should be understood that the modifications or changes of the present invention are possible and included within the scope not apart from the sprit of the invention.

DESCRIPTION OF THE PREFERRED EMBODIMENTS

An embodiment of the present invention will now be described with reference to the accompanying drawings. In order to avoid the duplication of the explanation, the same reference numerals will be simply used for the like members in the prior art. Also, the duplicated items in each embodiment are designated by the same reference numerals and the explanation therefor will be omitted.

I. First Embodiment (FIGS. 1A to 1C)

Figure 1A:
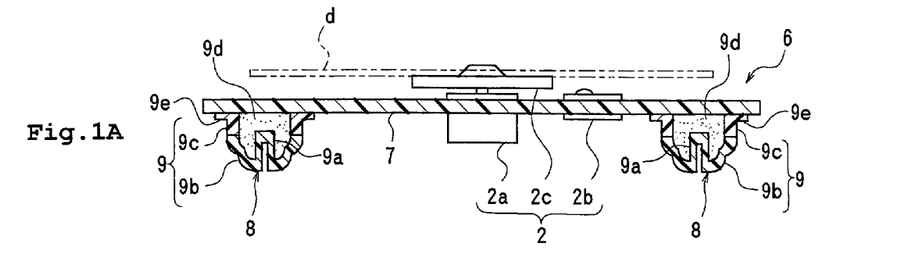
FIG. 1A is a partial schematic cross sectional view showing a mechanical chassis in accordance with a first embodiment of the present invention.

A mechanical chassis 6 shown in FIG. 1A is provided in a reproduction apparatus for automotive audio systems and is provided with a reading mechanism 2 for a disc-like recording medium and integrally formed vibration preventing dampers 8 on a chassis 7.

The chassis 7 as a whole is formed of a polypropylene resin and very light in weight. Three vibration preventing dampers 8 are formed integrally on the chassis 7. Circumferential wall portions 9c are fixed to elastic wall portions 9b having agitating sleeve portions 9a as "retainers" in a damper housing 9 thereof. Each of the elastic wall portions 9b is made of a styrene system thermoplastic elastmer whose hardness measured by a type A durometer with reference to JIS K6253 is 30, whose compression permanent strain is 30% and whose loss efficient tan δ is 0.20. The circumferential wall portion 9c is made of a polypropylene resin that is a thermoplastic resin. These are melt bonded and formed integrally together through a coinjection molding within molds. Reference symbol 9d indicates viscous fluid that is a silicone grease with a rotational viscosity of 1.2 m$^3$/s. Then, in order to fix the damper housing 9 to the chassis 7, an outward flange 9e of the circumferential wall portion 9c as an "opening side end portion of the damper housing" is brought into contact with and melt bonded by supersonic waves with the vibration preventing damper forming portion of the chassis 7. Thus, on the rear surface of the chassis 7, three vibration preventing dampers 8 are integrally formed downwardly.

Figure 1B:
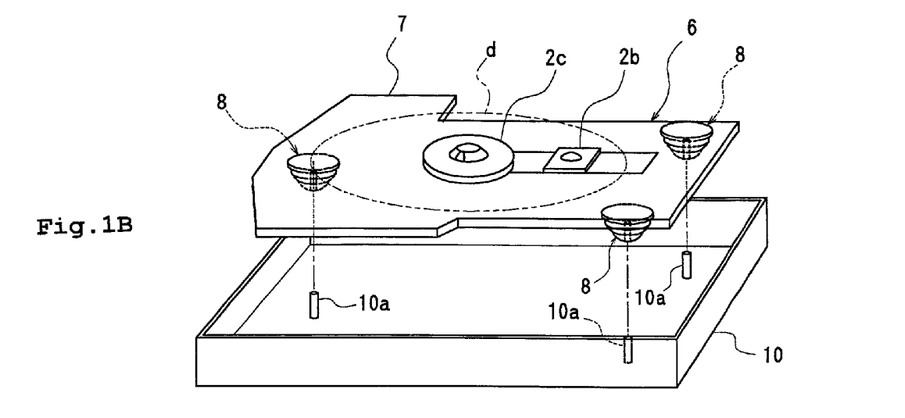
FIG. 1B is an illustration of the mechanical chassis to be mounted on a casing.
Figure 1C:
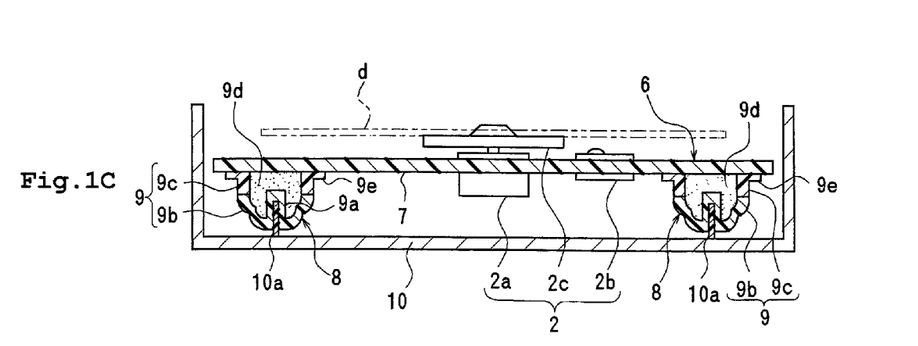
FIG. 1C is an illustration showing a mounted condition of the mechanical chassis to the casing.

Then, when the mechanical chassis 6 is to be mounted on a casing 10, as shown in FIGS. 1A to 1C, the work for inserting three support rods 10a provided on the casing 10 into the associated agitating sleeve portions 9a of the damper housing 9, respectively, is performed. Note that the mechanical chassis 6 is supported to the casing 10 also by means of spring members (not shown).

In the above-described mechanical chassis 6 according to this embodiment, since any lid member for closing the damper housing 9 of the vibration preventing damper 8 is not required and a planar surface of the chassis 7 may be also used as a "lid", even though the vibration preventing damper 8 is provided on the chassis 7, a height of the vibration preventing damper 8 may be reduced corresponding to a thickness of the lid member that has been conventionally required and it is possible to cope with the miniaturization of the mounting space. Further, since, when the mechanical chassis 6 is to be mounted on the casing 10, only the insertion work of the support rods 10a suffices, it is possible to remarkably enhance the work efficiency. Furthermore, in the mechanical chassis 6 according to this embodiment, the circumferential wall portion 9c of the vibration preventing damper 8 is made of a polypropylene resin that is a hard resin. For this reason, since a sufficient reactive force may be given by the hard inner wall even if the viscous fluid 9d is fluidized in the interior, it is possible to obtain the vibration preventing damper 8 that has a high attenuation performance to suppress the floating motion of the agitating sleeve portion 9a.

II. Second Embodiment (FIG. 2)

Figure 2:
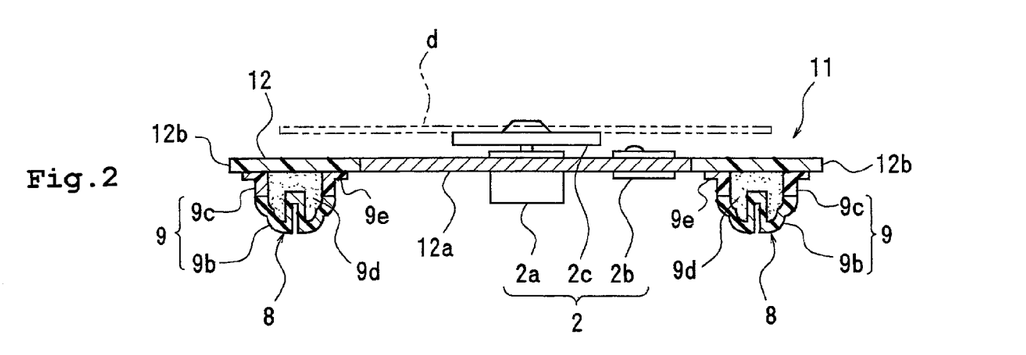
FIG. 2 is a schematic partial cross sectional view showing a mechanical chassis in accordance with a second embodiment of the present invention.

The difference between a mechanical chassis 11 shown in FIG. 2 and the mechanical chassis 6 according to the first embodiment is that a mounting portion of a reading mechanism 2 that needs a rigidity and a dimensional precision is a metal portion 12a made of a stainless steel and each vibration preventing damper forming portion is a resin portion 12b that is made of a polypropylene resin. The other points are the same as those of the first embodiment.

In the mechanical chassis 11 according to this embodiment, since the reading mechanism 2 is mounted on a metal portion 12a in addition to the resultant effect of the mechanical chassis 6 according to the first embodiment, the dimensional precision among the movable regions of the motor, the disc table and the pickup is high to thereby obtain the more precise reading mechanism 2.

Note that as a modification inherent in the second embodiment, the metal portion 12a that is made of a stainless steel may be formed of, for example, a thermoplastic synthetic resin such as a denaturated polyphenylene ether resin. In this case, denaturated polyphenylene ether resin corresponding to the metal portion 12a and the polypropylene resin forming resin portions 12b may be integrated to form the chassis 12.

III. Third Embodiment (FIGS. 3A to 3C)

Figure 3A:
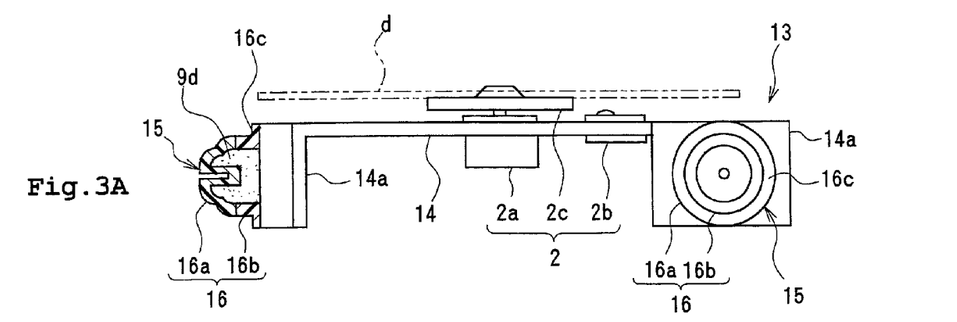
FIG. 3A is a partial schematic cross sectional view showing a mechanical chassis in accordance with a third embodiment of the present invention.
Figure 3B:
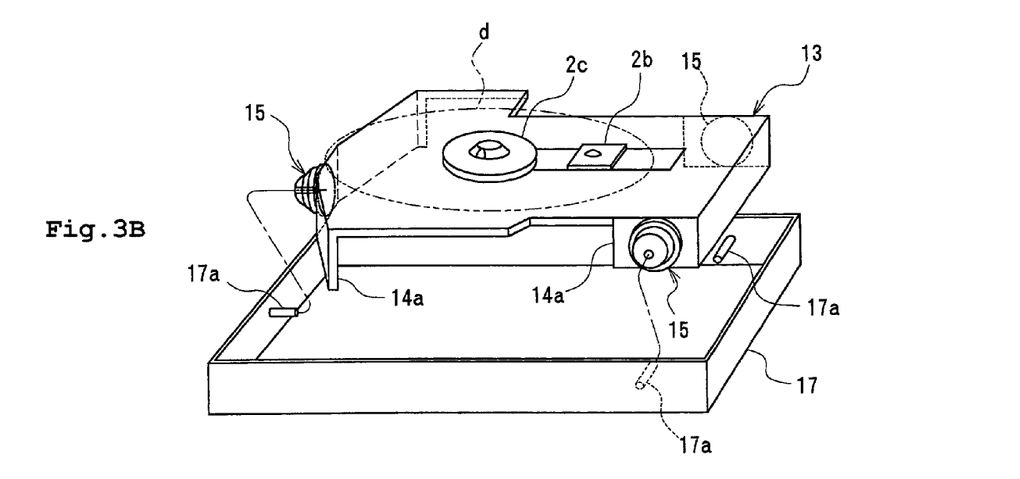
FIG. 3B is an illustration of the mechanical chassis to be mounted on a casing.
Figure 3C:
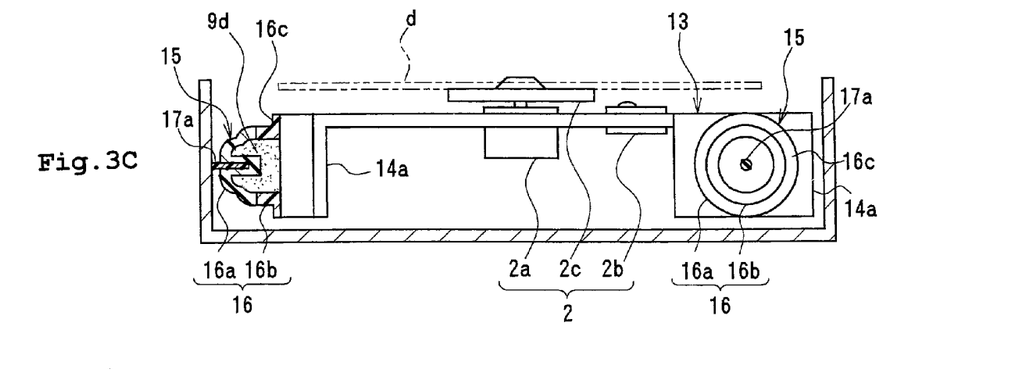
FIG. 3C is an illustration showing a mounted condition of the mechanical chassis to the casing.

The difference between a mechanical chassis 13 shown in FIGS. 3A to 3C and the mechanical chassis 6 according to the first embodiment is that the overall material of the chassis 14 is a polyphenylene ether, a sidewall 14a is suspended from the chassis 14 as the vibration preventing damper forming portion, the material of an elastic wall portion 16a of a damper housing 16 of a vibration preventing damper 15 is a halogenized butyl rubber, and the material of a circumferential wall portion 16b is a denaturated ether resin. Further, the damper housing 16 is fixed to the side wall 14a through the ultrasonic wave bonding with an outward flange 16c that is an opening side end portion in the horizontal condition. Accordingly, when the mechanical chassis 13 according to this embodiment is to be mounted on a casing 17, the damper housing 16 is fitted around support rods 17a projecting laterally from the side wall of the casing 17.

In the mechanical chassis 13 according to this embodiment, since the elastic wall portion 16a per se is made of a halogenized butyl rubber which has a vibration attenuation performance, in addition to the resultant effect of the above-described first embodiment, it is possible to realize the mechanical chassis 13 provided with the vibration preventing damper 15 that is superior in vibration preventing characteristics or shock proof characteristics.

Note that in any one of the mechanical chassis in accordance with fourth to sixth embodiments described below, in addition to the enhancement of the mounting work of the mechanical chassis as described above, a through hole is formed in the chassis and this through hole is utilized as an interior space (volume) for the vibration preventing damper to thereby make it possible to form the vibration preventing damper in much smaller size. Accordingly, in each embodiment, it is possible to reduce a projecting height of the vibration preventing damper from the chassis, mount the damper even if the space between the casing and the mechanical chassis is small, and realize the desired vibration attenuation performance.

IV. Fourth Embodiment (FIG. 4A)

Figure 4A:
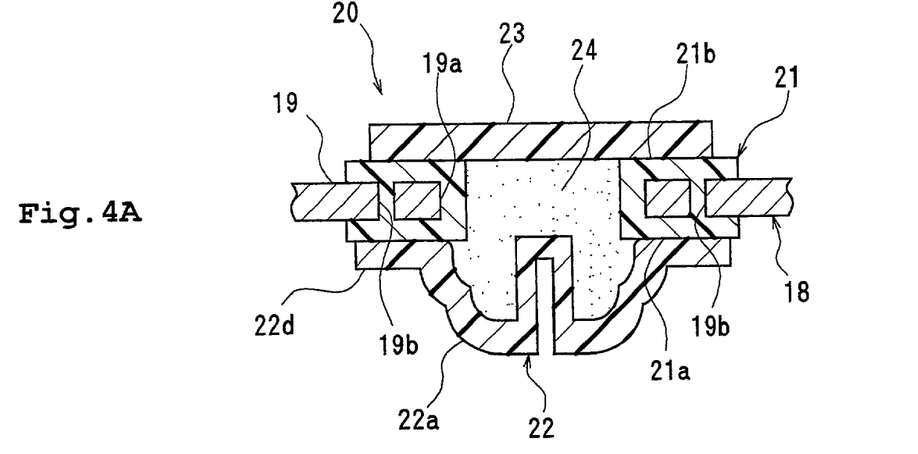
FIG. 4A is a partial enlarged cross sectional view of a mechanical chassis in accordance with a fourth embodiment of the present invention.

In a mechanical chassis 18 shown in FIG. 4A, only a partial enlarged cross sectional view of a vibration preventing damper 20 formed downwardly on the rear surface of a chassis 19 is shown. The mounting structure of this mechanical chassis 18 to the casing is the same as that of the first embodiment.

The chassis 19 in accordance with this embodiment is made of a stainless steel and is provided with a through hole 19a as shown. A plurality of small holes 19b are partially formed along the outer circumference of the through hole 19a at the hole edge of the through hole 19a. Under the condition that the small holes 19b are filled, a resin portion 21 formed of a polyphenylene ether resin is integrally formed to cover the hole edge over the full circumference.

A damper housing 22 is formed of an elastic wall portion 22a made of a butyl rubber and an outward flange 22b is fixed to a lower surface 21a of the resin portion 21 through vulcanization bonding. Further, a lid member 23 is fixed with adhesives to an upper surface 21b of the resin portion 21, whereby under the condition that the viscous fluid 24 is filled in the interior, the interior of the damper housing 22 is hermetically sealed and the vibration preventing damper 20 is formed integrally with the chassis 19.

In the mechanical chassis 18 according to this embodiment, in addition to the above-described resultant effects, since the polyphenylene ether resin forming the resin portion 21 is filled in the interior of the small holes 19b and the resin portion 21 is firmly integrated with the hole edge of the through hole 19a, the resin portion 21 is prevented from falling apart from the chassis 19 resulting in a breakdown of the vibration preventing damper 20.

V. Fifth Embodiment (FIG. 4B)

Figure 4B:
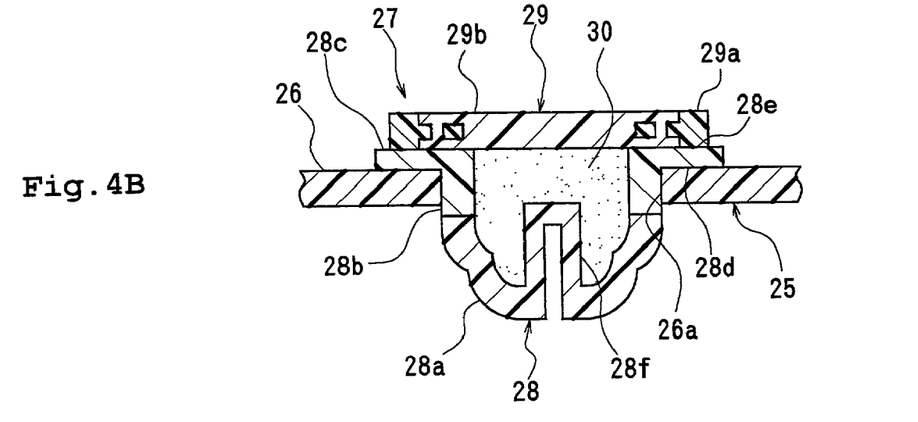
FIG. 4B is a partial enlarged cross sectional view of a mechanical chassis in accordance with a fifth embodiment of the present invention.

In a mechanical chassis 25 shown in FIG. 4B, only a partial enlarged cross sectional view of a vibration preventing damper 27 formed downwardly on the rear surface of a chassis 26 is shown. The mounting structure of this mechanical chassis to the casing is the same as that of the first embodiment.

The vibration preventing damper forming portion of the chassis 26 in accordance with this embodiment is made of a polypropylene resin. Accordingly, the chassis 26 in accordance with this embodiment may be formed of a polypropylene resin as a whole or may have the metal portion 12a as in the second embodiment of FIG. 2. Reference symbol 26a denotes a through hole through which a damper housing 28 may be inserted.

An elastic wall portion 28a of the damper housing 28 is made of a styrene system thermoplastic elastmer and a circumferential wall portion 28b is made of a polypropylene resin. The damper housing is formed integrally within the molds by melt-bonding. A bottom surface 28d of an outward flange 28c is fixed to the hole edge of the through hole 26a through an ultrasonic wave heat bonding. Further, a lid member 29 is fixed to a top surface 28e of the outward flange 28c to hermetically seal a viscous fluid 30 filled in the interior. An outer circumferential frame portion 29a of a polypropylene resin and a bottom wall portion 29b of a styrene system thermoplastic elastmer are formed integrally in a coinjection molding. The outer circumferential frame portion 29a out of them is fixed to the top surface 28e of the outward flange 28c by the ultrasonic wave heat bonding.

In the mechanical chassis 25 according to this embodiment, in addition to the above-described resultant results, since the outer circumferential frame portion 29a and the top surface 28e of the outward flange 28c are firmly fixed to each other and at the same time, the shock is absorbed by the soft elastic deformation of the bottom wall portion 29b made of a styrene system thermoplastic elastmer even if an agitating sleeve portion 28f of the elastic wall portion 28a is subjected to vibration having a high magnitude and a large shift to be moved largely upwardly (in the drawing), it is possible to absorb the vibration having a large magnitude also by the bottom wall portion 29b.

VI. Sixth Embodiment (FIG. 4C)

Figure 4C:
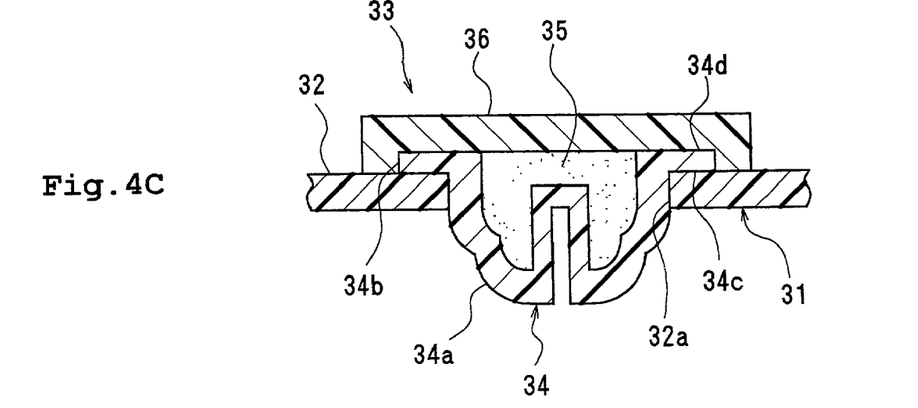
FIG. 4C is a partial enlarged cross sectional view of a mechanical chassis in accordance with a sixth embodiment of the present invention.

In a mechanical chassis 31 shown in FIG. 4C, only a partial enlarged cross sectional view of a vibration preventing damper 33 formed downwardly on the rear surface of a chassis 32 is shown. The mounting structure of this mechanical chassis to the casing is the same as that of the first embodiment.

In the chassis 32 in accordance with this embodiment, the vibration preventing damper forming portion is made of polypropylene resin, and a through hole 32a having such a size that a damper housing 34 may be inserted through the through hole 32a is formed. Note that the overall structure of the chassis 32 may have the metal portion 12a as in the second embodiment of FIG. 2 in the same manner as in the chassis 26 in accordance with the fifth embodiment. The damper housing 34 is made of a styrene system thermoplastic elastmer and a bottom surface 34c of an outward flange 34b of an elastic wall portion 34a is fixed to the hole edge of the through hole 32a through the melt bonding within the molds. The damper housing 34 is formed integrally with the vibration preventing damper forming portion through the heat bonding within the molds. A lid member 36 of a polypropylene resin is fixed to the chassis 32 made of the same polypropylene resin by the ultrasonic wave heat bonding so as to close the interior of the damper housing 34 filled with a viscous fluid 35 and a top surface 34d of the outward flange 34b.

In the mechanical chassis 31 in accordance with this embodiment, the fixture is not performed through the resin portion 21 on the back surface of the chassis 19 as in the damper housing 22 in accordance with the above-described fourth embodiment and there is no circumferential wall portion 28b in accordance with the fifth embodiment. Accordingly, the projecting height of the vibration preventing damper 33 from the chassis 32 is further lowered. It is possible to satisfactorily meet the requirement of reduction in mounting space.

VII. Common Modification for each Embodiment

In the foregoing embodiments, the case where the vibration preventing dampers 8, 15, 20, 27 and 33 are formed respectively in the chassis 7, 12, 14, 19, 26 and 32 is shown. However, the damper may be formed on the casing 10 or 17.

Alternatively, the plurality of vibration preventing dampers 8, 15, 20, 27 and 33 may be formed separated for the chassis 7, 12, 14, 19, 26 and 32 and the casing 10 or 17.

In each of the foregoing embodiments, the case where the bottomed sleeve-like agitating sleeve portion 9a or 28f is provided to the damper housings 9, 16, 22, 28 or 34 as the "holder" is shown. However, without such agitating sleeve portion 9a, 28f, it is possible to form a heat portion having a larger diameter than a shaft diameter of the pivot shaft and simply provide the engagement hole that may fit the head portion.

In each of the foregoing embodiments, the case where the vibration is attenuated by the agitating resistance generated by agitating the viscous fluids 9d, 24, 30 and 35 by the agitating sleeve portions 9a, 28f as the vibration preventing dampers 8, 15, 20, 27 and 33 is shown. However, for example, without the agitating sleeve portion 9a of the damper housing 9 shown in, FIGS. 1A to 1C, it is possible to form an orifice hole through the chassis 7, and to fix the lid member having a U-shaped cross section as shown in FIG. 4C onto the top surface of the chassis 7 to attenuate the vibration by the fluid resistance of the viscous fluid flowing through the orifice hole in accordance with the elastic deformation of the damper housing.

In each of the foregoing embodiments, the case where the vibration preventing dampers 8, 15, 20, 27 and 33 in which the viscous fluids 9d, 24, 30 and 35 is filled in the interior is shown. However, for example, it is possible to form a through hole for communicating the air between the inside and the outside of the vibration preventing dampers 8, 15, 20, 27 and 33 to the lid members 23, 29 and 36 or the damper housings 9, 16, 22, 28 and 34 and introduce and discharge the air between the inside and the outside of the vibration preventing damper due to the elastic deformation of the damper housing to thereby obtain an air damper for attenuating the vibration due to the fluid resistance. Further, in the case of the first to third embodiments, the orifice hole may be formed through the chassis 7, 12 and 14 rather than the lid members 23, 29 and 36 or the damper housings 9, 16, 22, 28 and 34.

According to this invention, the vibration preventing damper that has been conventionally formed separately is formed integrally with either the casing or the mechanical chassis. Accordingly, when the mechanical chassis is mounted on the casing, it is sufficient to hold the support shaft of either the casing or the mechanical chassis to the vibration preventing damper to remarkably enhance the working efficiency. Further, since the vibration preventing damper may be small in size, it is possible to mount the damper even if the space between the casing and the mechanical chassis is reduced by downsizing. In addition, the damper may exhibit the desired vibration attenuating performance.

Further, according to the mechanical chassis provided with the through hole, it is possible to utilize the through hole as the interior space (volume) of the damper housing. It is therefore possible to further reduce the size of the vibration preventing damper.

What is claimed is:

1. A mechanical chassis apparatus including a non-contact reading mechanism for a disc recording medium and a vibration preventing damper attached on a chassis member supported in a floating condition through the vibration preventing damper within a casing, comprising:

the vibration preventing damper having a damper housing made of a resin material, provided with a holder portion in a form of a container opened at one end for inserting a support shaft provided in the casing and an elastic wall portion for reducing floating movement of the support shaft due to elastic deformation in three-dimensional directions, and the chassis member having a resin hole edge covering portion for covering a hole edge of a through hole formed in the chassis member with both front and rear surfaces of the chassis member, wherein the opening side end portion of the damper housing is fixed to said resin hole edge covering portion on one side surface of the chassis member and a lid member made of a resin material is fixed to said resin hole edge covering portion on the other side surface of the chassis member, so that said resin hole edge covering portion at the chassis member is forming a portion of the vibration preventing damper, and said vibration preventing damper is formed integrally with said chassis member without using mechanical fasteners.

2. A mechanical chassis apparatus according to claim 1, wherein the holder portion of the damper housing is formed as a bottomed agitating shaft portion for holding the support shaft provided in the casing and viscous fluid for giving an agitating resistance due to viscous fluidization to the agitating shaft portion that moves in accordance with the movement of the support shaft is provided within an interior of the vibration preventing damper.

3. A mechanical chassis apparatus including a non-contact reading mechanism for a disc recording medium and a vibration preventing damper attached on a chassis member supported in a floating condition through a vibration preventing damper within a casing, comprising:

the vibration preventing damper having an opening side end portion of a damper housing made of a resin material, a holder portion in a form of a container opened at one end for inserting a support shaft provided in the casing, and an elastic wall portion for reducing floating movement of the support shaft due to elastic deformation in three-dimensional directions, the chassis member comprising a metal portion in which said non-contact reading mechanism is provided and a resin portion in which a through hole is included and is formed integrally with said metal portion, wherein a through hole is provided in the vibration preventing damper forming portion of a resin portion of said chassis member, and wherein the opening side end portion of the damper housing is fixed to a hole edge of the through hole on one side surface of the chassis member, and a lid member made of a resin material for closing the through hole is fixed to the hole edge of the through hole on the other side surface of the chassis member, so that a resin hole edge covering portion at the chassis member is forming a portion of the vibration preventing damper, and said vibration preventing damper is formed integrally with said chassis member without using mechanical fasteners.

4. A mechanical chassis apparatus according to claim 3, wherein the holder portion of the damper housing is formed as a bottomed agitating shaft portion for holding the support shaft provided in the casing and viscous fluid for giving an agitating resistance due to viscous fluidization to the agitating shaft portion that moves in accordance with the movement of the support shaft is provided within an interior of the vibration preventing damper.

5. A mechanical chassis apparatus including a non-contact reading mechanism for a disc recording medium and a vibration preventing damper attached on a chassis member supported in a floating condition through the vibration preventing damper within a casing, comprising:

the vibration preventing damper having a damper housing made of a resin material provided with a holder portion in a form of a container opened at one end for inserting a support shaft provided in the casing and an elastic wall portion for reducing floating movement of the support shaft due to elastic deformation in three-dimensional directions, said damper housing providing an outward flange on an opening side end portion, and the chassis member comprising a metal portion in which said non-contact reading mechanism is provided and a resin portion in which a through hole is formed, wherein the one side surface of the outward flange comes in contact with a hole edge of the through hole, the damper housing is fixed to said chassis member and a lid member made of a resin material for closing the opening side end portion of the damper housing is fixed to the other side surface of the outward flange, so that said vibration preventing damper is formed integrally with said chassis member without using mechanical fasteners.

6. A mechanical chassis apparatus according to claim 5, wherein the holder portion of the damper housing is formed as a bottomed agitating shaft portion for holding the support shaft provided in the casing and viscous fluid for giving an agitating resistance due to viscous fluidization to the agitating shaft portion that moves in accordance with the movement of the support shaft is provided within an interior of the vibration preventing damper.

7. A mechanical chassis apparatus comprising:

a chassis member having a non-contact reading mechanism for a disc recording medium, a metal plate, in which a through hole is formed in a vibration preventing damper forming portion, and an annular resin portion that covers a hole inside and hole edges of the through hole at both front and rear surfaces;

a damper housing in the form of a container opened at one end, the damper housing having a holder portion for holding a support shaft that is provided projecting into a casing that houses the chassis member, an elastic wall portion that is capable of reducing a floating movement of the support shaft due to elastic deformation in three-dimensional directions, and an opening side end portion formed of a resin material; and a cover plate formed of a resin material, wherein a vibration preventing damper, in which an inner portion space of the damper housing formed by an inner circumferential surface of the annular resin portion is closed by the cover plate, is formed integrally with the chassis member by fixing the opening side end portion of the damper housing to the annular resin portion on one surface side of the chassis member, and fixing the cover plate to the annular resin portion in another surface side of the chassis member.

8. A mechanical chassis apparatus according to claim 7, wherein the holder portion of the damper housing is formed as a bottomed agitating shaft portion for holding the support shaft provided in the casing and viscous fluid for giving an agitating resistance due to viscous fluidization to the agitating shaft portion that moves in accordance with the movement of the support shaft is provided within an interior of the vibration preventing damper.

9. A vibration preventing damper forming method for supporting in a vibration proof manner a mechanical, chassis apparatus provided with a non-contact reading mechanism for a disc recording medium in a floating manner within a casing, a vibration preventing damper being formed integrally with the casing or the mechanical chassis apparatus, the method comprising the steps of:

preparing a damper housing in the form of a container opened at one end, the damper housing having a holder portion for holding a support shaft provided in one of the casing and the mechanical chassis apparatus, an elastic wall portion that is capable of reducing a floating movement of the support shaft due to elastic deformation in three-dimensional directions, and an opening side end portion formed of a resin material, and preparing a cover plate formed of a resin material; and regarding the other of the casing and the mechanical chassis apparatus, forming a through hole that passes through the plate thickness of a portion that forms the vibration preventing damper, wherein an opening of the damper housing is fixed to a hole edge of the through hole on one surface side of the other of the casing and the mechanical chassis apparatus, and the cover plate is fixed to a hole edge of the through hole on another surface side, thereby closing an inner portion space that is formed by both the damper housing and the through hole, and integrally forming the vibration preventing damper with the casing or the mechanical chassis apparatus.

10. A vibration preventing damper forming method according to claim 9, wherein the opening of the damper housing is fixed to the hole edge of the through hole through an ultrasonic wave heat bonding on one surface side.

11. A vibration preventing damper and chassis assembly, comprising:

a chassis member; and a vibration preventing damper attached to the chassis member as an integral construction without mechanical fasteners, wherein the chassis member is fabricated from metal and has a through hole formed therethrough and the vibration preventing damper includes a damper housing having an elastic wall portion formed with an internal agitating sleeve and fabricated from a thermoplastic elastomer, a resin portion fabricated from resin and integrally connected to the chassis member forming a ring covering at least an inner periphery of the through hole, a lid member fabricated from resin and a viscous fluid contained in the vibration preventing damper and in contact with the internal agitating sleeve, the elastic wall portion is integrally connected to the resin portion on one side of the chassis member and the lid member is integrally connected to the resin portion on an opposite side of the chassis member in a manner such that the elastic wall portion and the lid member are isolated from contact with the chassis member.

12. A vibration preventing damper forming method for supporting in a vibration proof manner a mechanical chassis apparatus provided with a non-contact reading mechanism for a disc recording medium in a floating manner within a casing, a vibration preventing damper being formed integrally with the casing or the mechanical chassis apparatus, the method comprising the steps of:

preparing a damper housing in the form of a container opened at one end, the damper housing having a holder portion for holding a support shaft provided in one of the casing and the mechanical chassis apparatus, an elastic wall portion that is capable of reducing a floating movement of the support shaft due to elastic deformation in three-dimensional directions, and an opening side end portion formed of a resin material, and preparing a cover plate formed of a resin material; and regarding the other of the casing and the mechanical chassis apparatus, forming a through hole that passes through the plate thickness in a metal portion that forms the vibration preventing damper and forming an annular resin portion that covers hole edges of the through hole at both front and rear surfaces, wherein an opening of the damper housing is fixed to the annular resin portion on one surface side of the other of the casing and the mechanical chassis apparatus, and the cover plate is fixed to the annular resin portion of the other surface side, thereby closing an inner portion space that is formed by both the damper housing and the through hole, and integrally forming the vibration preventing damper with the casing or the mechanical chassis apparatus.

* * * * *